United States Patent [19]

Irby

[11] 3,708,808
[45] Jan. 9, 1973

[54] INFANT RESTRAINER

[76] Inventor: James E. Irby, Route 3, Box 145, Spartanburg, S.C. 29301

[22] Filed: March 30, 1971

[21] Appl. No.: 129,525

[52] U.S. Cl. .......................................... 5/95, 5/327 R
[51] Int. Cl. .................................................. A47d 7/04
[58] Field of Search ........................... 5/93–95, 98 R, 5/98 B, 99 A, 327 R

[56] References Cited

UNITED STATES PATENTS

| | | | |
|---|---|---|---|
| 3,419,309 | 12/1968 | Smith | 297/456 |
| 2,429,350 | 10/1947 | Farrand | 5/98 R |
| 2,287,907 | 6/1942 | Schettler | 5/98 R |
| 3,269,621 | 8/1966 | Dishart | 5/94 UX |

Primary Examiner—James C. Mitchell
Attorney—Wellington M. Manning, Jr.

[57] ABSTRACT

A portable, collapsible device is disclosed that may be placed on a surface such as a bed, erected and an infant placed therein whereby the infant is precluded from rolling out of the confined area provided by the device. The instant infant restrainer thus obviates the necessity for a crib or the like for the very small infant and generally comprises a base which may or may not be padded, side walls associated with the base which when erected at opposite sides of the base provide barriers against movement by the infant. Collapsibility of the device requires means for holding the walls in the erected position when desired. As such, certain means are disclosed for use in erecting the side walls, holding the side walls in the erected position and optionally being attachable to a surface such as a bed so as to immobilize the entire device. The device may also be adapted for use in an automobile where a seat belt may be used to secure the device to an automobile seat.

14 Claims, 8 Drawing Figures

PATENTED JAN 9 1973 3,708,808
SHEET 1 OF 2
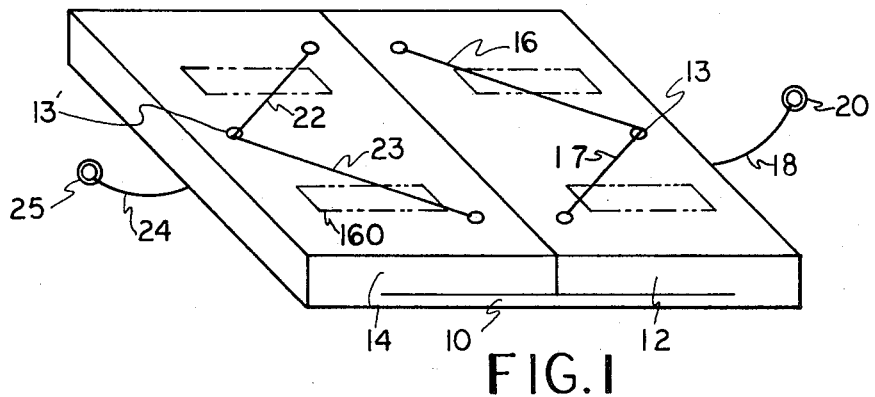
FIG.1
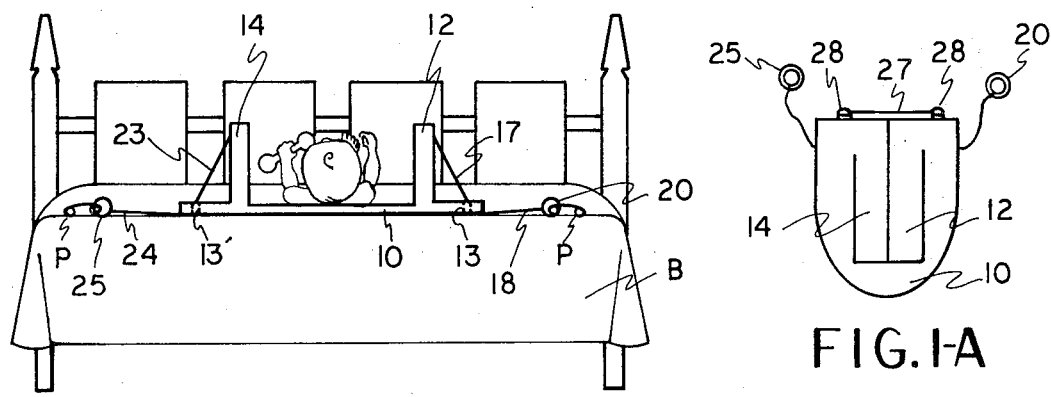
FIG.2  FIG.1-A
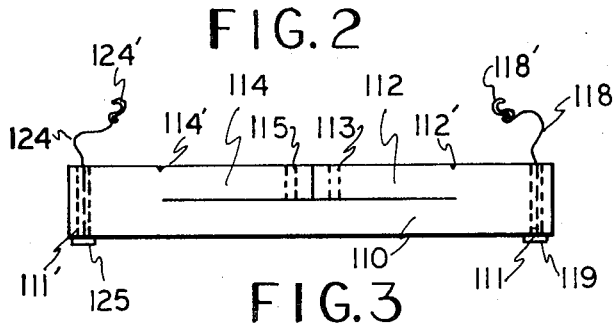
FIG.3  FIG.8
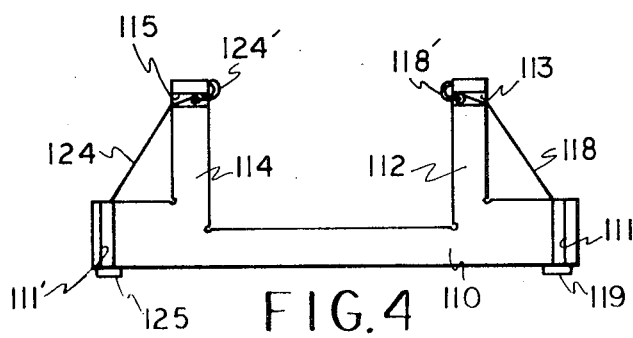
FIG.4
INVENTOR.
JAMES E. IRBY
BY
Wellington M. Manning Jr.
ATTORNEY

INFANT RESTRAINER

BACKGROUND OF THE INVENTION

The transportation of very small infants without the home, requires the use of some means either in transit or at the ultimate destination for providing an area where the infant may be placed to sleep without the danger of the infant falling or otherwise becoming removed from the sleeping area. Obviously, baby cribs, bassinets and the like may be used. In many instances, however, these items are not available either in route or at the final destination and the costs for obtaining same would be prohibitive for only sporadic use. As such, the parents of the infant must carry their own equipment, or upon reaching the destination arrange a temporary barrier or barriers from pillows or the like for securing the infant in a particular location.

Several items have been devised for use in conjunction with infants for securing an infant in a particular location or for providing a barrier against movement by the infant. These items have obviously not been successful due to their apparent absence from the marketplace. Such absence is probably predicated upon the necessary high cost of the item due to its construction or to the complexity or bulkiness of the item.

The instant invention provides a device that overcomes the problems of the prior art. As such, a portable, collapsible device is disclosed that may be cheaply manufactured, is easy to operate, and is quite reliable insofar as restraint of the infant without endangering the infant in any way, shape or form.

The prior art does not teach or suggest the instant invention. Exemplary of the prior art are U. S. Pat. Nos. 2,266,681 to Wakefield; 2,622,250 to Coles; 2,863,450 to Johnson; 2,868,194 to Lee; 3,323,147 to Van Dean; 3,419,309 to Smith and 3,513,489 to Miller et al.

SUMMARY OF THE INVENTION

It is an object of the present invention to provide a novel portable, collapsible crib like device for an infant.

Still another object of the present invention is to provide a novel crib like device for an infant that may be used on a bed or other surface.

Another object of the present invention is to provide a crib like device for an infant that may be used in the home or in an automobile to prevent an infant from moving from an intended location.

Generally speaking, the present invention relates to a collapsible infant restrainer comprising a base; side walls associated with said base and residing adjacent thereto, said side walls being erectable to an approximate vertical position on opposite sides of said base; and separate means for selectively holding each side wall in its erected position whereby an infant placed therebetween is prevented from rolling out of said restrainer.

More specifically, the present invention relates to a crib like device used to maintain an infant in a particular location on a base or pallet on which the infant is placed. Associated with the base in a hinged, sliding, or other association, are a plurality of side walls which may be erected and held in place on opposite sides of the base so as to provide a partial enclosure in which a very small infant may be placed without the danger of the infant falling or rolling out of the restricted area.

In each embodiment of the present invention, the crib like device is collapsible to a very convenient size whereby it may be carried quite readily by an individual who is also carrying the baby, a diaper bag or the like. In this regard, separate handles may be provided or the holding means that are used to maintain the side walls in an erected position may, if suitable, serve a dual purpose which also includes that of a handle means.

The device of the present invention is adapted for cheap construction whereby its ultimate cost to the consumer will be well within the realm of reason for such a device. Factors leading to the low cost of the device are its simplicity, and availability of materials of construction. In this regard, the device may be entirely constructed insofar as the base and side walls are concerned, from a plastic or other synthetic material, thereby eliminating the need for undue fabrication. Additionally, a synthetic foam device may be manufactured or the device can be constructed of any other material as desired which fulfills the utility as described hereinafter.

Holding means that are employed to maintain the side walls in an erected position, depending upon the ultimate design of the overall device, may at the same time serve as a means for anchoring the overall device to a surface on which it rests, such as a bed, sofa or the like. Moreover, as desired, the device may be manufactured in such a manner that the holding means may likewise double as a handle means to facilitate the ease of carrying of the device in the folded or portable condition.

BRIEF DESCRIPTION OF THE DRAWINGS

FIG. 1 is an isometric view of an infant restrainer according to the teachings of the present invention shown in a collapsed condition.

FIG. 1-A is an end view of the embodiment of FIG. 1 shown in a folded condition.

FIG. 2 is an end view of the embodiment shown in FIG. 1, but in the erected position showing a particular use thereof.

FIG. 3 is an end elevation of the embodiment shown in FIG. 1, but having a modification thereto.

FIG. 4 is an end view of an embodiment as shown in FIG. 3 showing the side walls in the erected position.

FIG. 8 is a side view of the embodiment as shown in FIG. 6, but in the collapsed position.

DESCRIPTION OF THE SPECIFIC EMBODIMENTS

Figure 5:
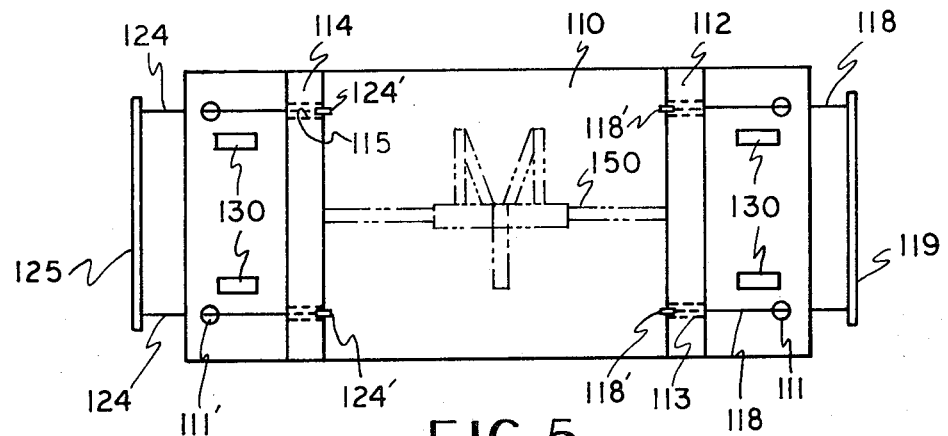
FIG. 5 is a top plan view of the embodiment shown in FIG. 3 with the side walls erected.

Referring to the Figures, specific embodiments of the present invention will now be described in detail. In FIG. 1, an embodiment of the present invention is shown in a flat position and comprises a base 10 having side walls 12 and 14 integral therewith. Side wall 12 has suitably affixed thereto holding means 16 and 17 which join to form an elongated element 18. Holding means 16 and 17 pass through an opening 13 in base 10 to the underside thereof where member 18 is located and terminates as a hook or other attachment means 20. Side wall 14 is provided with holding means 22 and 23 secured at one end thereto and passing downwardly through an opening 13' in base 10. Holding means 22 and 23 combine into an elongated element 24 which terminates as a hook or other attachment means 25 in a similar manner as was provided on side wall 12.

FIG. 1-A shows an infant restraining device as described in FIG. 1 when the device is folded to permit ease of handling. As shown, the resiliency of the material of construction, such as a semi-rigid polyurethane foam, permits folding of the device. A rigid material of construction such as a plastic sheet material would also permit the folded configuration of FIG. 1-A, but might require fold lines to permit bending of the various parts of the device. Likewise, as shown in FIG. 1-A, the device may be provided with locking means 27, such as a strap secured to an end of base 10 having attachment means 28 adjacent an end thereof for securement to an opposite end of base 10 when the device is folded.

FIG. 2 shows usage of the embodiment as described with respect to FIG. 1. The device is placed on a bed or the like B. The end view of the device shows the base 10 flush with the top of the bed B and having an infant lying thereon. Side wall 12 has been raised to a vertical position and is held in said position by the holding means (only 17 shown) which passes downwardly through opening 13 in base 10 and is secured to the bed by suitable means such as a safety pin P passing through hook 20. Likewise, side wall 14 is shown raised to the up position and is held there by the holding means (only 23 shown) which passes downwardly through opening 13' in base 10 and secured to the bed by suitable means such as a safety pin P or the like which passes through hook 25. As shown in FIG. 2, the infant rests on base 10 which may be a plastic sheet, a foam member, a padded member or the like. With the side walls in the raised position, it may be readily seen that the infant will not roll out of the confines of the side walls 12 and 14. Moreover, base 10 on which the infant lies will, in fact, protect the bed covering from damage by the baby or its body wastes.

FIGS. 3, 4 and 5 show still a further embodiment of the present invention. A base 110 is provided having side walls 112 and 114 integral therewith. Bend lines 112' and 114' are provided at the base of walls 112 and 114 respectively to facilitate the bending of side walls 112 and 114 thereat during raising. Side walls 112 and 114 are also provided with openings 113 and 115 respectively for receiving appropriate holding means. Depending upon the material of construction for side walls 112 and 114, openings 113 and 115 may be best provided with grommets (not shown) to prevent damage thereto by the holding means.

Base 110 is provided with openings 111 and 111' therein through which holding means 118 and 124 pass respectively. Holding means 118, shown as an elongated element, such as a cord, is secured to an enlarged flange-handle combination 119 which resides on the underside of base 110. Holding means 118 then passes through opening 111 and terminates thereabove at hook means 118'. Holding means 124 on the opposite end of base 110 likewise is secured to an enlarged flange-handle means 125 which resides beneath base 110, passes through opening 111' and terminates at hook means 124'.

As shown in FIGS. 4 and 5, when side walls 112 and 114 are erected to the vertical position, hooks 118' and 124' of holding means 118 and 124 respectively are passed through openings 113 and 115 of walls 112 and 114 respectively. As sides 112 and 114 tend to move downwardly to the closed position, holding means 118 and 124 move through openings 111 and 111' in base 110 until handles 119 and 125 contact the underside of base 110 whereby further movement of side walls 112 and 114 is precluded. As best seen in FIG. 5, base 110 may also be provided with a plurality of slots 130 through which a seat belt may pass to secure the device to a car seat. A suitable harness may also be provided with the device to prevent an infant from being thrown from within the device when used in an automobile. Such a harness 150 is shown in phantom in FIG. 5 though various other types may be equally suitable.

In the folded position similar to that shown in FIG. 1-A, handles 119 and 125 may be used for carrying the device. In this situation, hook means 118' and 124' will come to rest against openings 111 and 111' in base 110 and prevent holding means 118 and 124 from being removed therefrom.

Figure 6:
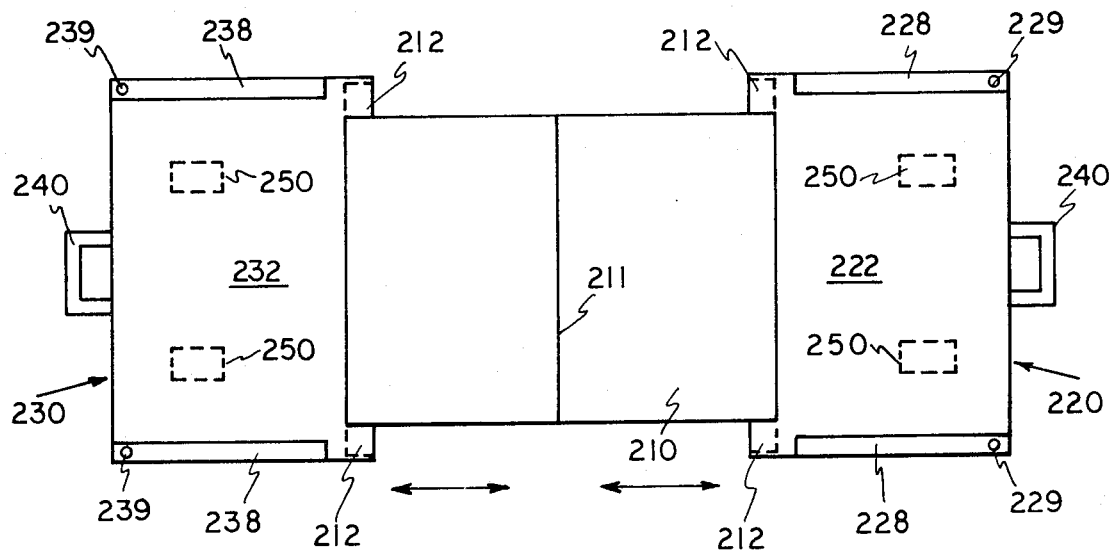
FIG. 6 is a top plan view of a further embodiment of a device according to the teachings of the present invention.
Figure 7:
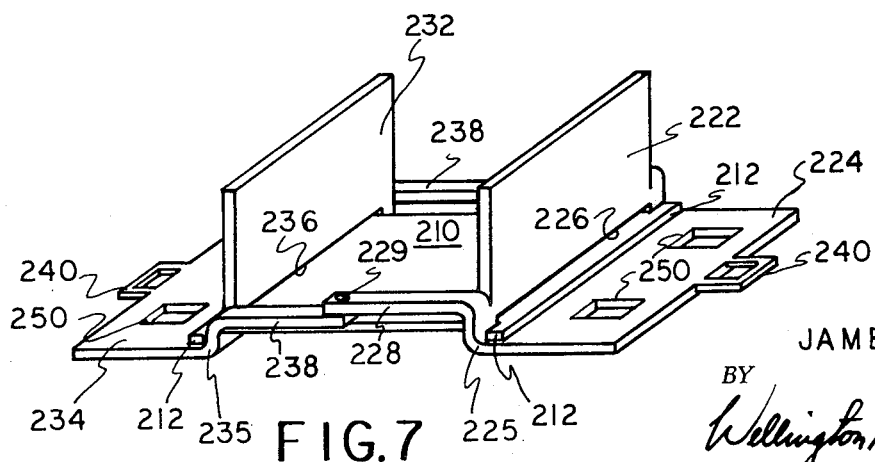
FIG. 7 is an isometric view of the embodiment of the present invention as shown in FIG. 6 with the side walls erected.

A further embodiment of the present invention is shown in FIGS. 6, 7 and 8. FIG. 6 shows the device in a flat, expanded condition where a base 210 is provided between side members generally indicated as 220 and 230. Base 210 is provided with a fold line 211 across the center thereof and has tabs 212 at the extreme corners thereof, the purpose of which will be described hereinafter. Side member 220 comprises a side wall 222 and a cover member 224, side wall 222 and cover member 224 being hingedly connected to each other at 225 with a slit 226 extending partially along the hinge connection. Likewise, side member 230 comprises a side wall 232 and a cover member 234 which are hingedly connected at 235 with a slit 236 extending partially along the hinge connection. One side of base 210 thus extends through slit 226 and the opposite side through slit 236 where corner tabs 212 of base 210 slidably connect base 210 and side members 220 and 230. From a dimensional standpoint, side member 220 is preferably of a size just larger than one half of the area of base 210 whereby side member 220 can be moved in the direction of the arrows shown in FIG. 6 so as to cover or uncover base 210. Hence with side members 220 and 230 covering base 210, the structure may be folded along center line 211 of base 210 so as to fold the device for convenient portability as seen in FIG. 8. In the folded condition, straps 250 and 252 may be desirable to hold the sides together. Straps 250 and 252 may be secured to one side member and removably secured to the other side member in any convenient fashion.

As desired, the device may be unfolded and the side members 220 and 230 extended outwardly towards the ends of base 210. Outward movement is limited by corner tabs 212. At this point, side walls 222 and 232 may be raised around the hinge connection with cover members 224 and 234 to the approximate vertical position. Side walls 222 and 232 are provided with hinged holding means 228 and 238 respectively, each of which has attachment means 229 and 239 respectively. In the vertical position holding means 228 of side wall 222 are bent forward in the direction of the opposite side wall where they engage holding means 238 of side wall 232 and are securable to each other by attachment means 229 and 239. With the holding means thus attached by snaps, Velcro type fasteners, or the like, side walls 222 and 232 are maintained in the vertical position. In this regard, it should be pointed out that this particular embodiment of holding means should be manufactured of a material of sufficient rigidity such that the side walls 222 and 232 will not tend to move toward a closed position. A natural bias may be built into the combination of side walls 222 and 232 with the respective cover members 224 and 234 such that the normal bias is to the flat position which would be away from base 210, thus lessening any danger of side walls 222 and 232 collapsing on the infant placed therebetween. The holding means 228 and 238 when attached to each other, however, would prevent the side walls 222 and 232 from following the natural bias and moving away from base 210 to a flat position. FIGS. 6, 7 and 8 also show the addition of handle means 240 positioned on each of the cover members 224 and 234. Additionally, other tabs or closure members 250 and 252 (See FIG. 8) may be provided such that when the device is collapsed and folded, the device may be maintained in the folded position. Slots 250 are also shown to receive seat belts or the like for use of the device in automobiles.

The device of the present invention may be further modified to provide side walls with openings therein. Such openings may be provided to assure ample air flow between the side walls in the event a small infant should roll to one of the walls and rest on its stomach. Obviously, the design of side walls is well within the purview of one skilled in the art. As such, openings 160 are only shown in phantom in FIG. 1.

As mentioned above, the materials of construction for the various embodiments of the device according to the teachings of the present invention may be as desired. In this regard, plastics, foam, fiberboard or the like may be desired due to the economy and availability thereof.

Having described the present invention in detail, it is obvious that one skilled in the art will be able to make variations and modifications thereto without departing from the scope of the invention. Accordingly, the scope of the present invention should only be determined by the claims appended hereto.

What is claimed is:

1. A collapsible infant restrainer comprising:
   a. a base;
   b. side walls associated with said base and residing adjacent thereto, said side walls being erectible to an approximately vertical position on opposite sides of said base; and
   c. separate means to releasibly hold each side wall in an erected position, said side wall holding means being attached to said side wall adjacent the top thereof, passing through said base and having attachment means at an opposite end thereof for securement to a surface other than said restrainer, whereby said side walls can be held in the up position and said restrainer can be secured to said surface.

2. A collapsible infant restrainer as defined in claim 1 wherein said side walls are integral with said base.

3. A collapsible infant restrainer as defined in claim 1 wherein said side walls define a plurality of openings therein to permit air flow therethrough.

4. A collapsible infant restrainer comprising:
   a. a base;
   b. side walls slidably associated with said base and residing adjacent thereto, said side walls being erectible to an approximately vertical position on opposite sides of said base; and
   c. means to releasibly hold each side wall in an erected position whereby an infant placed therebetween is prevented from rolling out of said restrainer.

5. A collapsible infant restrainer as defined in claim 4 wherein said side walls are slidable outwardly to opposite sides of said base.

6. A collapsible infant restrainer as defined in claim 4 wherein said side wall holding means are integral with said side wall and have attachment means at an outer end thereof for securing said side walls in the up position.

7. A collapsible infant restrainer as defined in claim 6 wherein the side wall holding means for one side wall is attachable to holding means for the other side wall.

8. A collapsible infant restrainer as defined in claim 4 wherein said side walls are hingedly secured to a cover member, said side wall and said cover member defining a slot therebetween through which a portion of said base passes.

9. A collapsible infant restrainer as defined in claim 8 wherein said cover members define openings therein whereby said restrainer may be secured to a surface.

10. A collapsible infant restrainer comprising:
    a. a base;
    b. side walls associated with said base and residing adjacent thereto, said side walls being erectible to an approximately vertical position on opposite sides of said base; and
    c. separate means to releasibly hold each side wall in an erected position, said side wall holding means being secured to said side wall adjacent the top thereof, passing through said base and having means at an opposite end thereof to prevent withdrawal of said holding means from said base.

11. A collapsible infant restrainer as defined in claim 10 wherein said holding means are removably secured to said side wall.

12. A collapsible infant restrainer as defined in claim 11 wherein said side walls have at least one opening adjacent the upper end thereof and said side wall holding means is provided with hook means which pass through said openings to removably secure said holding means to said side wall.

13. A collapsible infant restrainer as defined in claim 10 wherein said withdrawal preventing means is a handle.

14. A collapsible infant restrainer as defined in claim 10 wherein said base defines a plurality of openings therein for securing said restrainer in place.

* * * * *